(12) United States Patent
Handte et al.

(10) Patent No.: US 11,362,871 B2
(45) Date of Patent: Jun. 14, 2022

(54) COMMUNICATION DEVICE AND METHOD FOR COMMUNICATION WITH A COUNTERPART COMMUNICATION DEVICE

(71) Applicant: Sony Corporation, Tokyo (JP)

(72) Inventors: Thomas Handte, Stuttgart (DE); Dana Ciochina, Stuttgart (DE); Nabil Sven Loghin, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 272 days.

(21) Appl. No.: 16/467,997

(22) PCT Filed: Dec. 12, 2017

(86) PCT No.: PCT/EP2017/082388
§ 371 (c)(1),
(2) Date: Jun. 10, 2019

(87) PCT Pub. No.: WO2018/108886
PCT Pub. Date: Jun. 21, 2018

(65) Prior Publication Data
US 2019/0305996 A1  Oct. 3, 2019

(30) Foreign Application Priority Data

Dec. 12, 2016 (EP) .................................. 16203496

(51) Int. Cl.
*H04L 27/26* (2006.01)
*H04L 1/00* (2006.01)
(Continued)

(52) U.S. Cl.
CPC ........ *H04L 27/2604* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS

2003/0235147 A1* 12/2003 Walton .................. H04L 1/0618
370/204
2006/0203713 A1*  9/2006 Laroia ................. H04L 27/0008
370/209
(Continued)

FOREIGN PATENT DOCUMENTS

CN     102067545 A    5/2011
CN     104429033 A    3/2015
(Continued)

OTHER PUBLICATIONS

Cordeiro, C., "Specification Framework for TGay", IEEE P802.11 Wireless LANs, 90 Pages total, (Dec. 9, 2016).
(Continued)

*Primary Examiner* — Alex Skripnikov
(74) *Attorney, Agent, or Firm* — Xsensus LLP

(57) ABSTRACT

A communication device and method are presented that support the use of both uniform and non-uniform constellations and provide a reasonable solution for signaling. Capability information is transmitted, said capability information indicating if non-uniform transmission constellations are supported by the mapping circuitry on the transmitter side and/or if non-uniform reception constellations are supported by the demapping circuitry on the receiver side.

16 Claims, 16 Drawing Sheets

| B0..B4 | B5..B9 | B10..B14 | B15..B19 | B20..B22 | B23 |
|---|---|---|---|---|---|
| Maximum NUC MCS for SC Rx | Maximum NUC MCS for SC Tx | Maximum NUC MCS for OFDM Rx | Maximum NUC MCS for OFDM Tx | Maximum number of SS with NUC support in Rx | Reserved |

(51) Int. Cl.
  *H04L 5/00* (2006.01)
  *H04L 27/34* (2006.01)
  *H04W 84/12* (2009.01)

(52) U.S. Cl.
  CPC .......... *H04L 1/0023* (2013.01); *H04L 5/0044* (2013.01); *H04L 27/3405* (2013.01); *H04L 5/0007* (2013.01); *H04L 27/2601* (2013.01); *H04W 84/12* (2013.01)

(56) References Cited

U.S. PATENT DOCUMENTS

| | | | | |
|---|---|---|---|---|
| 2009/0207765 | A1* | 8/2009 | Yamaura | H04B 7/0628 370/310 |
| 2011/0235721 | A1* | 9/2011 | Chen | H03M 13/136 375/240.25 |
| 2011/0261904 | A1* | 10/2011 | Seier | H04L 1/0009 375/298 |
| 2017/0012736 | A1* | 1/2017 | Klenner | H04L 27/3405 |
| 2018/0132224 | A1* | 5/2018 | Cheng | H04W 72/048 |
| 2018/0234118 | A1* | 8/2018 | Xi | H04L 1/0071 |

FOREIGN PATENT DOCUMENTS

| | | |
|---|---|---|
| CN | 105637829 A | 6/2016 |
| CN | 105960788 A | 9/2016 |
| EP | 1 997 344 | 9/2007 |
| EP | 197734 A1 | 10/2008 |
| WO | WO-2015074592 A1 * 5/2015 ......... H04L 27/3488 |
| WO | 2016/146664 A1 | 9/2016 |
| WO | 2016/166188 A1 | 10/2016 |

OTHER PUBLICATIONS

European Communication Pursuant to Article 94(3) dated Jul. 9, 2020 in European Application No. 17 8210 527.3.
International Search Report and Written Opinion dated Mar. 12, 2018 for PCT/EP2017/082388 filed on Dec. 12, 2017, 9 pages.
IEEE, "Wireless LAN Medium Access Control (MAC) and Physical Layer (PHY) Specifications", IEEE Std 802.11™—2012, Revision of IEEE Std 802.11—2007, IEEE Computer Society, Mar. 29, 2012, pp. 1-2695.
IEEE, "Wireless LAN Medium Access Control (MAC) and Physical Layer (PHY) Specifications", Amendment 3: Enhancements for Very High Throughput in the 60 GHz Band, IEEE Computer Society, IEEE Std 802.11ad™—2012, Dec. 28, 2012, pp. 1-598.
Xi et al., "Link Adaptation Algorithm for the IEEE 802.11n MIMO System", May 2008, 7th International IFIP-TC6 Networking Conference Singapore, pp. 780-791.
Lakshmanan et al., "On link rate adaptation in 802.11n WLANs", Proceedings IEEE INFOCOM, Shanghai, pp. 366-370, 2011.
IEEE, "Wireless LAN Medium Access Control (MAC) and Physical Layer (PHY) Specifications", IEEE P802.11-REVmc™ /D8.0, Aug. 2016, pp. 1-3648.

* cited by examiner

| Element ID | Length | STA Address | AID | DMG STA Capability Information | DMG AP Or PCP Capability Information | DMG STA Beam Tracking-Time Limit | Extended SC MCS Capabilities | Maximum Number Of Basic A-MSDU Subframes In A-MSDU | Maximum Number Of Short A-MSDU Subframes In A-MSDU | NUC capabilities field |
|---|---|---|---|---|---|---|---|---|---|---|
| 1 | 1 | 6 | 1 | 8 | 2 | 2 | 1 | 1 | 1 | |

Octets:

Fig. 8

| Bit: | B0 | B1 | B2 | B3 | B4 B5 | B6 | B7 B13 |
|---|---|---|---|---|---|---|---|
| | Reverse Direction | Higher Layer Timer Synchronization | TPC | SPSH and Interference Mitigation | Number of RX DMG Antennas | Fast Link Adaptation | Total Number of Sectors |
| | 1 | 1 | 1 | 1 | 2 | 1 | 7 |

| Bit: | B14 B19 | B20 | B21 B26 | B27 | B28 B51 | B52 |
|---|---|---|---|---|---|---|
| | RXSS Length | DMG Antenna Reciprocity | A-MPDU Parameters | BA with Flow Control | Supported MCS Set | DTP Supported |
| | 6 | 1 | 6 | 1 | 24 | 1 |

| Bit: | B53 | B54 | B55 | B56 | B57 B59 | B60 | B61 | B62 B63 |
|---|---|---|---|---|---|---|---|---|
| | A-PPDU Supported | Heartbeat | Supports Other_AID | Antenna Pattern Reciprocity | Heartbeat Elapsed Indication | Grant Ack Supported | RXSSTx-Rate Supported | Reserved |
| | 1 | 1 | 1 | 1 | 3 | 1 | 1 | 2 |

Fig. 10

| Bit: | B0 B4 | B5 B9 | B10 B14 | B15 B19 | B20 | B21 | B22 B23 |
|---|---|---|---|---|---|---|---|
| | Maximum SC Rx MCS | Maximum OFDM Rx MCS | Maximum SC Tx MCS | Maximum OFDM Tx MCS | Low-Power SC Mode Supported | Code Rate 13/16 | Reserved |
| | 5 | 5 | 5 | 5 | 1 | 1 | 2 |

Fig. 11

| Bit: | B0 B2 | B3 | B4 B6 | B7 |
|---|---|---|---|---|
| | Maximum Extended SC Tx MCS | Code Rate 7/8 Tx | Maximum Extended SC Rx MCS | Code Rate 7/8 Rx |
| | 3 | 1 | 3 | 1 |

Fig. 12

| MCS index | Modulation | NCBPS¹ (M) | Repetition² | Code rate (R) | Data rate³ (Mbps) |
|---|---|---|---|---|---|
| 1 | π/2-BPSK | 1 | 2 | 1/2 | 385 |
| 2 | π/2-BPSK | 1 | 1 | 1/2 | 770 |
| 3 | π/2-BPSK | 1 | 1 | 5/8 | 962.5 |
| 4 | π/2-BPSK | 1 | 1 | 3/4 | 1155 |
| 5 | π/2-BPSK | 1 | 1 | 13/16 | 1251.25 |
| 6 | π/2-BPSK | 1 | 1 | 7/8 | 1347.5 |
| 7 | π/2-QPSK | 2 | 1 | 1/2 | 1540 |
| 8 | π/2-QPSK | 2 | 1 | 5/8 | 1925 |
| 9 | π/2-QPSK | 2 | 1 | 3/4 | 2310 |
| 10 | π/2-QPSK | 2 | 1 | 13/16 | 2502.5 |
| 11 | π/2-QPSK | 2 | 1 | 7/8 | 2695 |
| 12 | π/2-16QAM | 4 | 1 | 1/2 | 3080 |
| 13 | π/2-16QAM | 4 | 1 | 5/8 | 3850 |
| 14 | π/2-16QAM | 4 | 1 | 3/4 | 4620 |
| 15 | π/2-16QAM | 4 | 1 | 13/16 | 5005 |
| 16 | π/2-16QAM | 4 | 1 | 7/8 | 5390 |
| 17 | π/2-64QAM | 6 | 1 | 5/8 | 5775 |
| 18 | π/2-64QAM | 6 | 1 | 3/4 | 6930 |
| 19 | π/2-64QAM | 6 | 1 | 13/16 | 7507.5 |
| 20 | π/2-64QAM | 6 | 1 | 7/8 | 8085 |

| 15a | π/2-16NUC | 4 | 1 | 13/16 | 5005 |
| 16a | π/2-16NUC | 4 | 1 | 7/8 | 5390 |

| 19a | π/2-64NUC | 6 | 1 | 13/16 | 7507.5 |
| 20a | π/2-64NUC | 6 | 1 | 7/8 | 8085 |

Fig. 15

| MCS index | Modulation | NCBPS¹ (M) | Repetition² | Code rate (R) | Data rate³ (Mbps) |
|---|---|---|---|---|---|
| 1 | π/2-BPSK | 1 | 2 | 1/2 | 385 |
| 2 | π/2-BPSK | 1 | 1 | 1/2 | 770 |
| 3 | π/2-BPSK | 1 | 1 | 5/8 | 962.5 |
| 4 | π/2-BPSK | 1 | 1 | 3/4 | 1155 |
| 5 | π/2-BPSK | 1 | 1 | 13/16 | 1251.25 |
| 6 | π/2-BPSK | 1 | 1 | 7/8 | 1347.5 |
| 7 | π/2-QPSK | 2 | 1 | 1/2 | 1540 |
| 8 | π/2-QPSK | 2 | 1 | 5/8 | 1925 |
| 9 | π/2-QPSK | 2 | 1 | 3/4 | 2310 |
| 10 | π/2-QPSK | 2 | 1 | 13/16 | 2502.5 |
| 11 | π/2-QPSK | 2 | 1 | 7/8 | 2695 |
| 12 | π/2-16QAM | 4 | 1 | 1/2 | 3080 |
| 13 | π/2-16QAM | 4 | 1 | 5/8 | 3850 |
| 14 | π/2-16QAM | 4 | 1 | 3/4 | 4620 |
| 15 | π/2-16QAM | 4 | 1 | 13/16 | 5005 |
| 16 | π/2-16QAM | 4 | 1 | 7/8 | 5390 |
| 17 | π/2-64QAM | 6 | 1 | 5/8 | 5775 |
| 18 | π/2-64QAM | 6 | 1 | 3/4 | 6930 |
| 19 | π/2-64QAM | 6 | 1 | 13/16 | 7507.5 |
| 20 | π/2-64QAM | 6 | 1 | 7/8 | 8085 |

| 15a | π/2-16NUC | 4 | 1 | 13/16 | 5005 |
|---|---|---|---|---|---|
| 16a | π/2-16NUC | 4 | 1 | 7/8 | 5390 |

| 19a | π/2-64NUC | 6 | 1 | 13/16 | 7507.5 |
|---|---|---|---|---|---|
| 20a | π/2-64NUC | 6 | 1 | 7/8 | 8085 |

Fig. 16

| MCS index | Modulation | NCBPS¹ (M) | Repetition² | Code rate (R) | Data rate³ (Mbps) |
|---|---|---|---|---|---|
| 1 | π/2-BPSK | 1 | 2 | 1/2 | 385 |
| 2 | π/2-BPSK | 1 | 1 | 1/2 | 770 |
| 3 | π/2-BPSK | 1 | 1 | 5/8 | 962.5 |
| 4 | π/2-BPSK | 1 | 1 | 3/4 | 1155 |
| 5 | π/2-BPSK | 1 | 1 | 13/16 | 1251.25 |
| 6 | π/2-BPSK | 1 | 1 | 7/8 | 1347.5 |
| 7 | π/2-QPSK | 2 | 1 | 1/2 | 1540 |
| 8 | π/2-QPSK | 2 | 1 | 5/8 | 1925 |
| 9 | π/2-QPSK | 2 | 1 | 3/4 | 2310 |
| 10 | π/2-QPSK | 2 | 1 | 13/16 | 2502.5 |
| 11 | π/2-QPSK | 2 | 1 | 7/8 | 2695 |
| 12 | π/2-16QAM | 4 | 1 | 1/2 | 3080 |
| 13 | π/2-16QAM | 4 | 1 | 5/8 | 3850 |
| 14 | π/2-16QAM | 4 | 1 | 3/4 | 4620 |
| 15 | π/2-16QAM | 4 | 1 | 13/16 | 5005 |
| 16 | π/2-16QAM | 4 | 1 | 7/8 | 5390 |
| 17 | π/2-64QAM | 6 | 1 | 5/8 | 5775 |
| 18 | π/2-64QAM | 6 | 1 | 3/4 | 6930 |
| 19 | π/2-64QAM | 6 | 1 | 13/16 | 7507.5 |
| 20 | π/2-64QAM | 6 | 1 | 7/8 | 8085 |

| 15a | π/2-16NUC | 4 | 1 | 13/16 | 5005 |
| 16a | π/2-16NUC | 4 | 1 | 7/8 | 5390 |
| 19a | π/2-64NUC | 6 | 1 | 13/16 | 7507.5 |
| 20a | π/2-64NUC | 6 | 1 | 7/8 | 8085 |

Fig. 17

| B0 | B1 | B2 | B3 | B4..B7 |
|---|---|---|---|---|
| NUC SC Rx | NUC SC Tx | NUC OFDM Rx | NUC OFDM Tx | Reserved |

Fig. 18

| B0..B4 | B5..B9 | B10..B14 | B15..B19 | B20..B23 |
|---|---|---|---|---|
| Maximum NUC MCS for SC Rx | Maximum NUC MCS for SC Tx | Maximum NUC MCS for OFDM Rx | Maximum NUC MCS for OFDM Tx | Reserved |

Fig. 19

| B0..B4 | B5..B9 | B10..B14 | B15..B19 | B20..B22 | B23 |
|---|---|---|---|---|---|
| Maximum NUC MCS for SC Rx | Maximum NUC MCS for SC Tx | Maximum NUC MCS for OFDM Rx | Maximum NUC MCS for OFDM Tx | Maximum number of SS with NUC support in Rx | Reserved |

COMMUNICATION DEVICE AND METHOD FOR COMMUNICATION WITH A COUNTERPART COMMUNICATION DEVICE

CROSS-REFERENCE TO RELATED APPLICATIONS

The present application is based on PCT filing PCT/EP2017/082388, filed Dec. 12, 2017, and claims priority to EP 16203496.1, filed Dec. 12, 2016, the entire contents of each are incorporated herein by reference.

BACKGROUND

Field of the Disclosure

The present disclosure relates to a communication device and a corresponding communication method for communication with a counterpart communication device.

Description of Related Art

Modern communications systems typically employ, among other elements, a coding and modulation apparatus (as part of a transmission apparatus) and a decoding and demodulation apparatus (as part of a receiving apparatus). The coding and modulation apparatus is often part of a so called BICM (Bit Interleaved Coded Modulation) apparatus, which generally comprises (at the transmitter side) a serial concatenation of a FEC (Forward Error Correction) encoder, a bit interleaver, and a modulator, which uses spectral efficient modulation such as BPSK (Binary Phase Shift Keying), QPSK (Quaternary Phase Shift Keying), or QAM (Quadrature Amplitude Modulation).

BICM allows for good performance due to the use of the interleaver and/or the FEC encoder. It has a reasonable decoding complexity as opposed to multilevel coding (MLC) coding schemes and is thus used frequently in communications systems, such as in all DVB systems (e.g. DVB-S2x), powerline communications (e.g., Homeplug AV), DAB, LTE, WiFi (IEEE 802.11), ATSC 3.0, etc. The first generation of 60 GHz WLAN is speci-fied in IEEE 802.11ad. Systems in accordance with IEEE 802.11ad use uniform constellations (UCs). Several Modulation and Coding Schemes (MCSs) are defined. Currently, there is a working group which investigates possible technologies for the next generation of the specification which will likely be called 802.11ay (or "next generation 60 GHz", due to the carrier frequencies of around 60 GHz). Next generation communication systems are going to consider non-uniform constellations (NUCs) which offer higher robustness against impairments such as noise, i.e. lower bit error rate as uniform constellations at same noise power.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admit-ted as prior art against the present disclosure.

SUMMARY

It is an object to provide a communication device and method that support the use of both uniform and non-uniform constellations and provide a reasonable solution for signaling. It is a further object to provide a corresponding computer program and a non-transitory computer-readable recording medium for implementing the communication method.

According to an aspect there is provided a communication device comprising
  an antenna unit comprising one or more antennas;
  a transmission circuitry configured to transmit one or more transmission streams, said transmission circuitry comprising
    a mapping circuitry configured to map transmission data on transmission symbols by mapping a predetermined number of transmission bits of transmission data onto a transmission symbol by use of a transmission constellation from among a plurality of transmission constellations; and
    a conversion circuitry configured to convert said transmission symbols into one or more transmission streams to be transmitted; and
  a reception circuitry configured to receive one or more reception streams, said reception circuitry comprising
    a reconversion circuitry configured to reconvert said received one or more reception streams into reception symbols; and
    a demapping circuitry configured to demap said reception symbols onto reception data by demapping a reception symbol onto a predetermined number of reception bits of reception data by use of a reception constellation,
  wherein said transmission circuitry is configured to transmit capability information indicating if non-uniform transmission constellations are supported by the mapping circuitry and/or if non-uniform reception constellations are supported by the demapping circuitry.

According to a further aspect there is provided a corresponding communication method comprising
  mapping transmission data on transmission symbols by mapping a predetermined number of transmission bits of transmission data onto a transmission symbol by use of a transmission constellation from among a plurality of transmission constellations;
  converting said transmission symbols into one or more transmission streams to be transmitted;
  transmitting said one or more transmission streams;
  receiving one or more reception streams;
  reconverting said received one or more reception streams into reception symbols;
  demapping said reception symbols onto reception data by demapping a reception symbol onto a predetermined number of reception bits of reception data by use of a reception constellation; and
  transmitting capability information indicating if non-uniform transmission constellations are supported by the mapping and/or if non-uniform reception constellations are supported by the demapping.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication device and as defined in the dependent claims and/or disclosed herein.

One of the aspects of the disclosure is to make use of capability information signaling which is exchanged between transmitter and receiver prior to regular data communications and holds information about support of non-uniform constellations. Further, in an aspect it may be indicated, e.g. in a preamble of a data packet, if the subsequent data part is modulated using non-uniform constellation. Hereby, single user (SU) with single stream or multi stream operation as well as multi user (MU) operation in the sense of MU-MIMO or FDMA may be addressed.

To maintain backwards compatibility, communication devices may wish to support both UCs and NUCs. NUCs may only apply to a subset of MCSs as gains for low constellation order are not significant. Further, a single non-uniform constellation may support several code rates although a dedicated NUC is required for achieving maximum gain at each code rate. Different transmission schemes may be supported by the communication scheme such as single carrier (SC) or orthogonal frequency division multiplex (OFDM) modulation. Each transmission scheme generally requires different NUCs for maximum performance.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 8 shows a DMG/EDMG capabilities element including capabilities information according to the present disclosure in a capabilities information field, FIG. 10 shows a DMG STA Capability information field according to IEEE802.11ad, FIG. 11 shows a supported MCS set subfield according to IEEE802.11ad, FIG. 12 shows an extended SC MCS Capabilities field according to IEEE802.11ad, FIG. 15 shows a first embodiment of an MCS table implementation, FIG. 16 shows a second embodiment of an MCS table implementation, FIG. 17 shows a third embodiment of an MCS table implementation, FIG. 18 shows a first embodiment of a capabilities information field according to the present disclosure, FIG. 19 shows a second embodiment of a capabilities information field according to the present disclosure.

DETAILED DESCRIPTION OF THE EMBODIMENTS

Modern communication systems use constellation diagrams to increase spectral efficiency. Those systems feature a mapper device which processes a group of M bits to a single symbol. The constellation diagram defines a unique mapping between a group of M bits and a single symbol. Since a group of M bits can have $2^M$ different values, a constellation diagram holds $2^M$ different signal points and their corresponding bit labels. On the receiver side a demapper performs the inverse operation. The higher M the more bits can be transmitted per channel use. However, susceptibility to noise increases, i.e. bit error rate increases, for larger M at same noise power.

In addition, modern communication systems feature a channel code which safeguards bits to be transmitted by adding further bits. A channel code is characterized by its code rate R which is defined by number of input bits divided by number of output bits at the transmitter side (encoder). A code may further be characterized by the code word length which is the block size of the output bits, i.e. some code may have a block wise processing. The higher the code rate and/or the shorter the code word length, the lower the error correction performance is. Typical values for code rate are e.g. ½, ¾, ⅝, ¹³⁄₁₆, ⅞. Different implementations for channel codes exist. Nowadays, binary convolutional codes (BCC) or low density parity check codes (LDPC) are typically applied. At transmitter side, an encoder converts a number of input bits into output bits according the encoding rules of the particular code and code rate. At receiver side, a decoder performs the inverse task.

Figure 1:
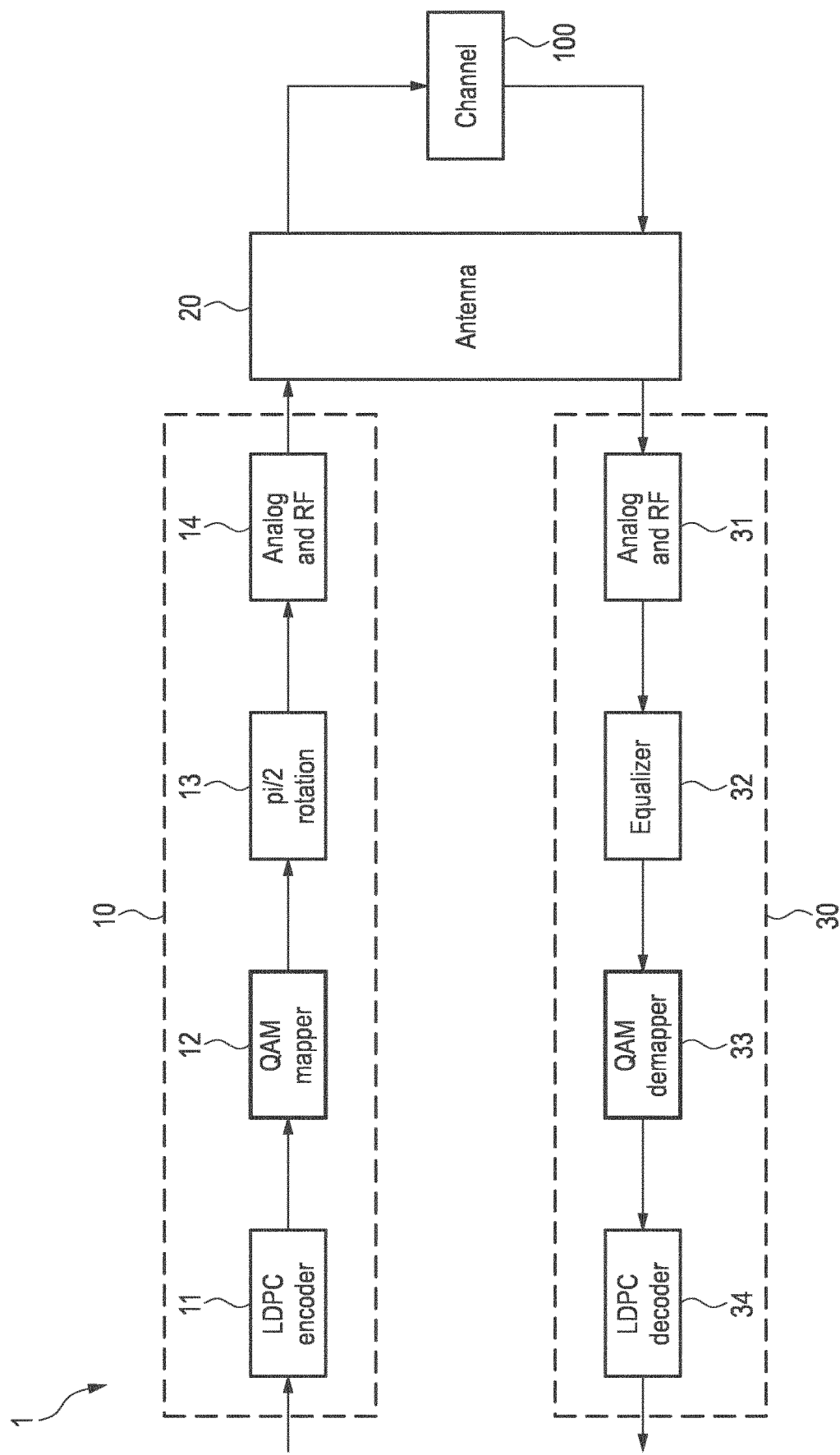
FIG. 1 shows a schematic diagram of a first embodiment of a communication device according to the present disclosure for single carrier modulation communication.

Referring now to the drawings, wherein like reference numerals designate identical or corresponding parts throughout the several views, FIG. 1 shows a schematic diagram of a first embodiment of a communication device 1 according to the present disclosure for single carrier (SC) modulation communication. Basically, on the transmitter side in a transmission circuitry 10 the bits to be transmitted are encoded by FEC encoder 11, e.g. an LDPC encoder, and mapped to QAM signal points by a QAM mapper 12. Subsequently, a pi/2 rotation of the QAM signal points optionally takes place in a pi/2 rotation unit 13, before the signal is converted by a conversion unit 14 into analog domain, amplified, filtered and frequency shifted to the transmission band (e.g. 60 GHz) and radiated from an antenna unit 20 comprising one or more antennas or antenna elements. Signals are transmitted via a channel 100, where impairments such as noise and fading deteriorate the transmit waveform.

On the receiver side, the inverse operations are performed. The signals are received by the antenna unit 20, in particular by the same one or more antennas used for transmitting or by one or more separate antennas, i.e. there might be Tx antennas for transmitting signals and (separate) Rx antennas for receiving. On the receiver side a reception circuitry 30 is provided comprising a reconversion unit 31, in which RF processing like frequency down-conversion, receive filtering, analog-to-digital conversion, etc. is performed on the received signals. The equalizer unit 32 minimizes channel impairments (e.g. fading, attenuation) according to an MMSE equalization rule for example, i.e. reverses the effect of channel distortions and forwards the equalized QAM symbols to the QAM demapper 33 (also called demodulator) for QAM demapping. Finally, decoding, e.g. LDPC decoding, is performed in a FEC decoder 34. In other embodiments of the communication device 1 additional elements may be provided, such as an input processing unit, an output processing unit, a framing unit, a deframing unit, and/or other elements as e.g. conventionally used in a receiving apparatus of a system in accordance with IEEE 802.11ad and 802.11ay.

Figure 2:
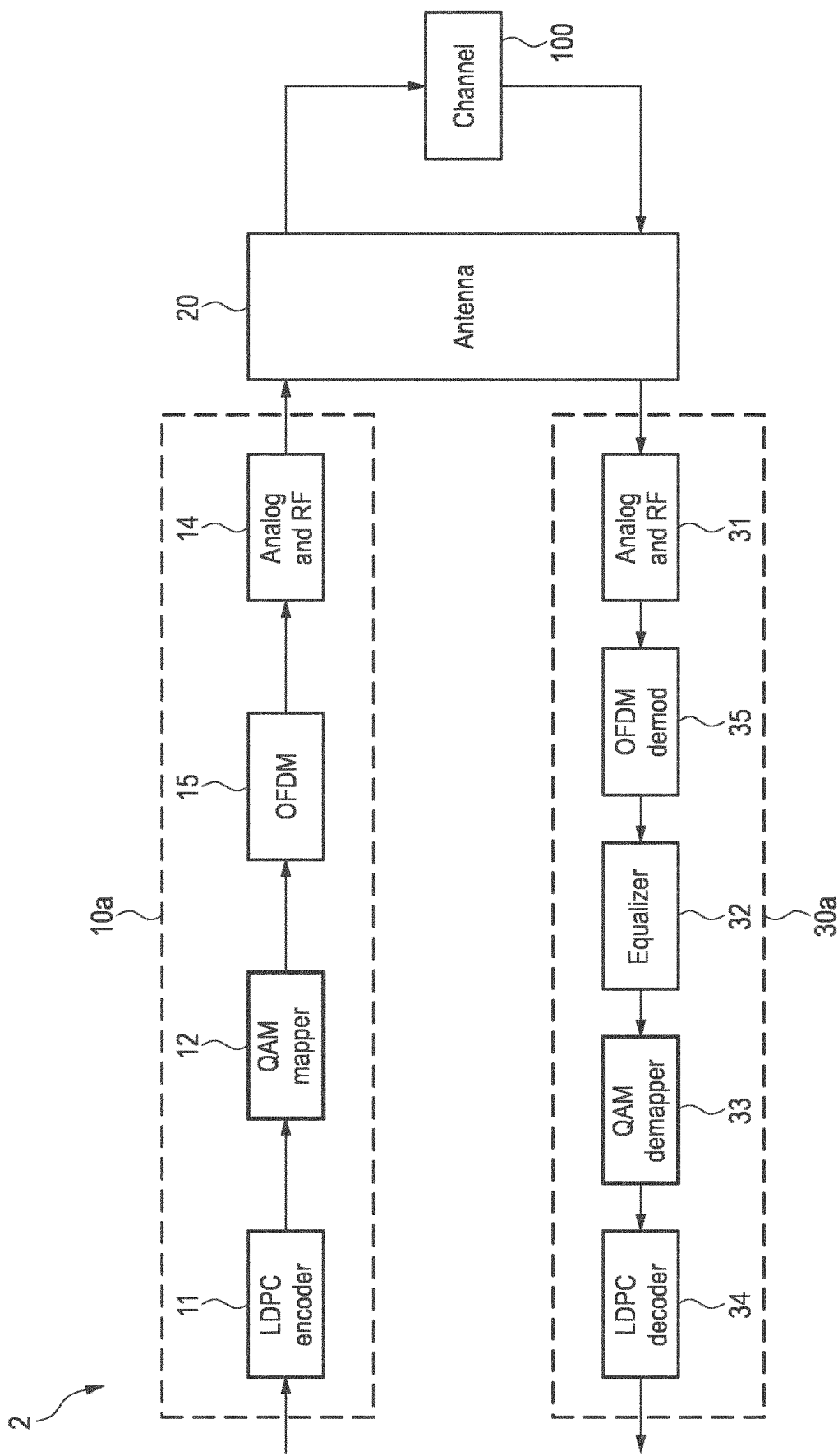
FIG. 2 shows a schematic diagram of a second embodiment of a communication device according to the present disclosure for OFDM carrier modulation communication.

FIG. 2 shows a schematic diagram of a second embodiment of a communication device 2 according to the present disclosure for OFDM carrier modulation communication comprising a slightly modified transmission circuitry 10a and a reception circuitry 20a. The communication device 2 is generally configured in the same way as the communication device 1, but instead of the optional pi/2 rotation unit 13 an OFDM modulation unit 15 is provided for OFDM modulation of the QAM signal points. On the receiver side an additional OFDM demodulation unit 35 is provided for OFDM demodulation.

Figure 3:
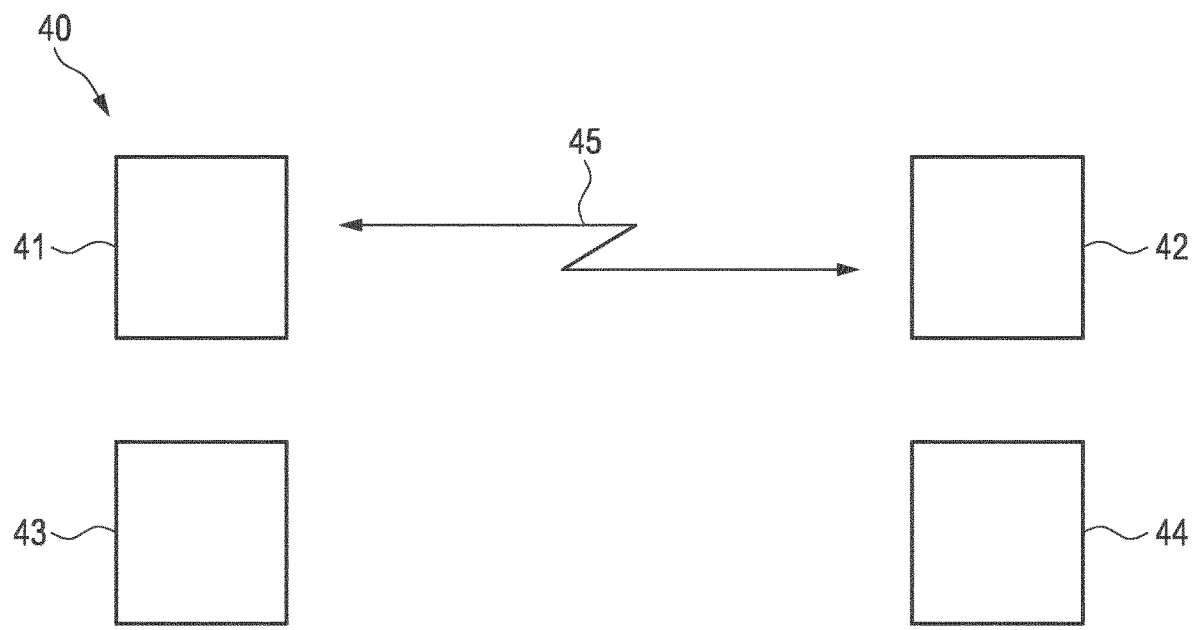
FIG. 3 shows a schematic diagram of an embodiment of a communications system according to the present disclosure.

FIG. 3 shows an embodiment of a communications system 40 according to the present disclosure comprising two or more communication devices 41, 42, 43, 44, each of which may be configured as a communication device according to the present disclosure, e.g. as shown in FIG. 1 or FIG. 2. As an example, the communication device 41, which may be a WiFi access point or WiFi router, communicates with communication device 42 (also called counterpart communication device), which may be a user device like a smartphone, laptop or tablet, via a bi-directional communication channel 45, for instance to provide access to the internet via the communication device 41. The communication devices 41 and 42 may thus use the ideas of the present disclosure in said communication session.

Generally, the mapping unit 12 is configured to mapping transmission data on transmission symbols by mapping a predetermined number of transmission bits of transmission data onto a transmission symbol by use of a transmission constellation from among a plurality of transmission constellations and the conversion 14 is configured to convert said transmission symbols into one or more transmission streams (also called spatial streams) to be transmitted by the antenna unit 20.

Figure 4:
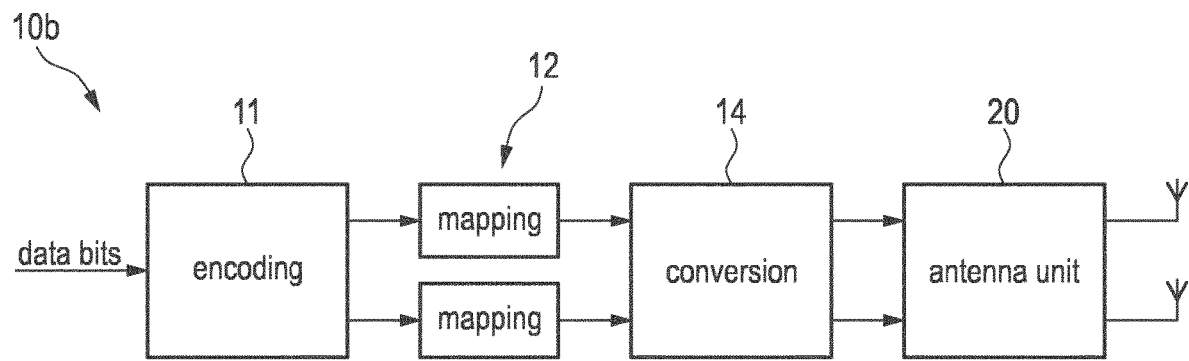
FIG. 4 shows a schematic diagram of a third embodiment of a transmission circuitry of a communication device according to the present disclosure for single user communication.

FIG. 4 shows a schematic diagram of a third embodiment of a transmission circuitry 10b of a communication device according to the present disclosure for single user communication. In this embodiment separate mapping units 12 are individually mapping the transmission data to be transmitted on different transmission streams by individual transmission constellations. A single antenna unit 20 comprising two or more antennas is provided for signal transmission.

Figure 5:
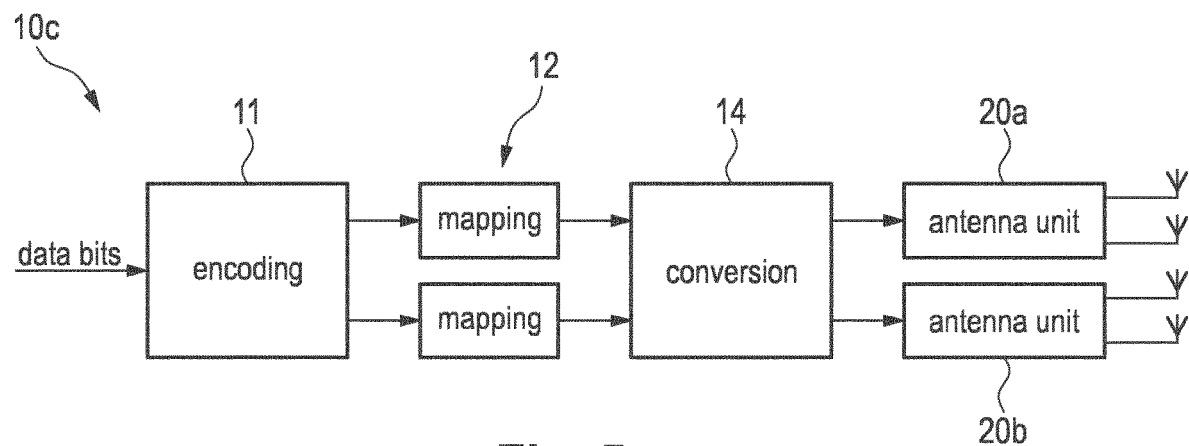
FIG. 5 shows a schematic diagram of a fourth embodiment of a transmission circuitry of a communication device according to the present disclosure for single user communication.

FIG. 5 shows a schematic diagram of a fourth embodiment of a transmission circuitry 10c of a communication device according to the present disclosure for single user communication. In this embodiment two or more antenna units 20a, 20b, each comprising two or more antennas, are provided for signal transmission. This will enable beamforming, if desired. The conversion unit 14 may thus include circuitry for beamforming, or a separate beamforming unit may be provided.

Figure 6:
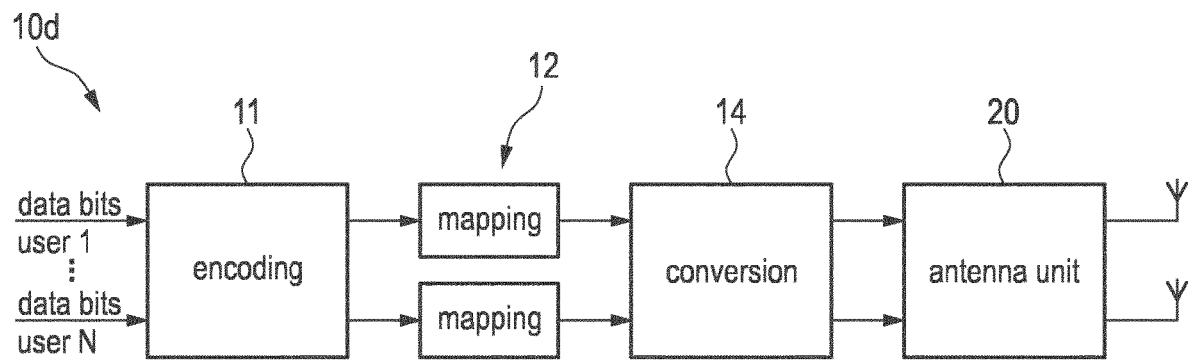
FIG. 6 shows a schematic diagram of a fifth embodiment of a transmission circuitry of a communication device according to the present disclosure for multi user communication.
Figure 7:
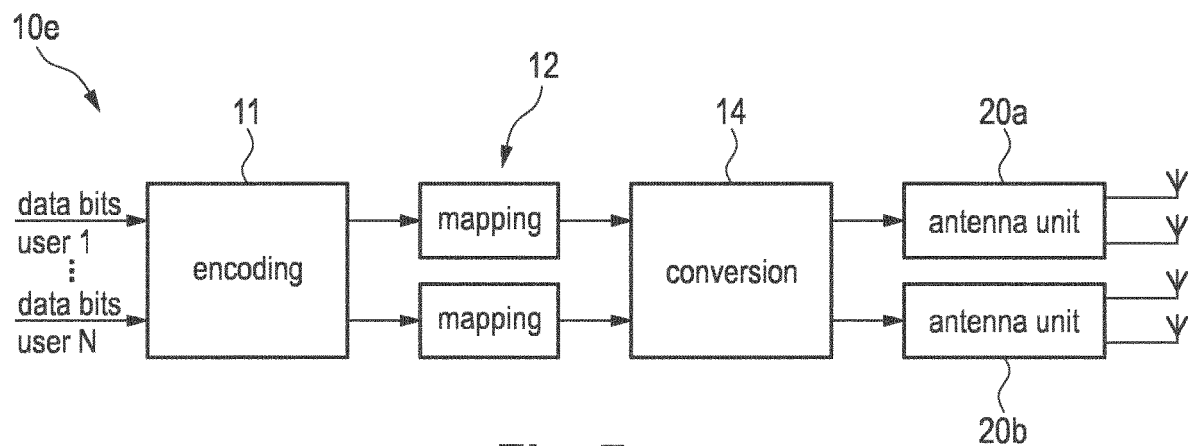
FIG. 7 shows a schematic diagram of a sixth embodiment of a transmission circuitry of a communication device according to the present disclosure for multi user communication.
Figure 9:
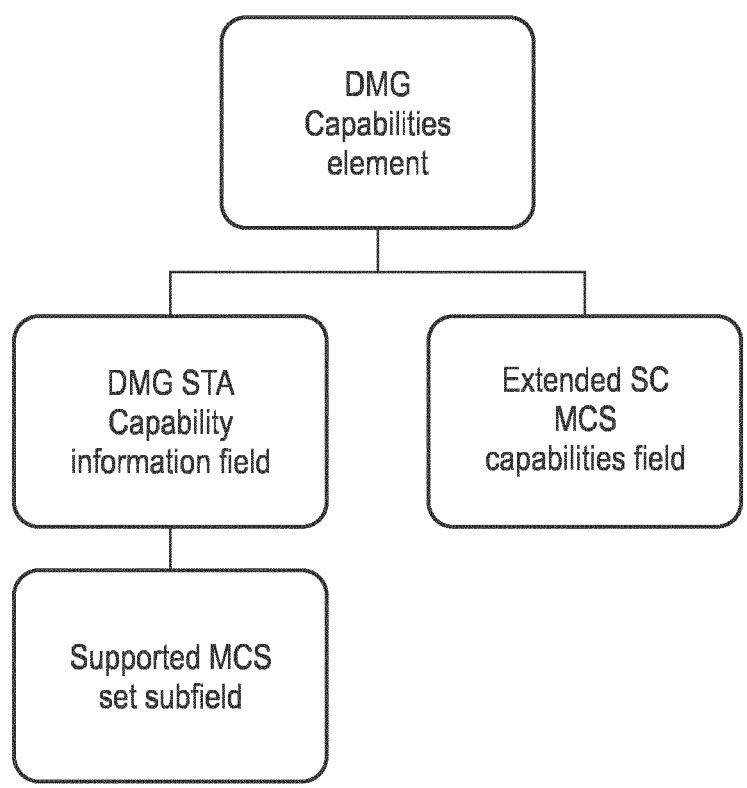
FIG. 9 shows an MCS signaling structure in DMG according to IEEE802.11ad.

FIGS. 6 and 7 show schematic diagrams of a fifth and a sixth embodiment of a transmission circuitry 10d, 10e of a communication device according to the present disclosure for multi user communication. In these embodiments N data bit streams are processed for N different users. In the transmission circuitry 10d a single antenna unit 20 is provided as in the transmission circuitry 10b, while in the transmission circuitry 10e two or more antenna units 20a, 20b are provided as in the transmission circuitry 10d.

Transmitters and receivers of a communication system typically support several sizes of constellation diagrams grouping M bits and several code rates R. Those are summarized in a table which is sometimes called modulation coding scheme (MCS) table. Each entry in the table is uniquely identified by a MCS index. Table 1 shows an exemplary MCS table according to IEEE802.11ay for SC modulation. A similar table can be defined for OFDM modulation as well. In this table NCBPS means number of coded bits per symbol, repetition means that some modulation scheme may use a repetition of symbols to enhance robustness against e.g. noise, and the given data rate holds for a single channel, single stream, and a guard interval length of 64 samples.

TABLE 1

| MCS index | Modulation | NCBPS (M) | Repetition | Code rate (R) | Data rate (Mbps) |
| --- | --- | --- | --- | --- | --- |
| 1 | π/2-BPSK | 1 | 2 | 1/2 | 385 |
| 2 | π/2-BPSK | 1 | 1 | 1/2 | 770 |
| 3 | π/2-BPSK | 1 | 1 | 5/8 | 962.5 |
| 4 | π/2-BPSK | 1 | 1 | 3/4 | 1155 |
| 5 | π/2-BPSK | 1 | 1 | 13/16 | 1251.25 |
| 6 | π/2-BPSK | 1 | 1 | 7/8 | 1347.5 |
| 7 | π/2-QPSK | 2 | 1 | 1/2 | 1540 |
| 8 | π/2-QPSK | 2 | 1 | 5/8 | 1925 |
| 9 | π/2-QPSK | 2 | 1 | 3/4 | 2310 |
| 10 | π/2-QPSK | 2 | 1 | 13/16 | 2502.5 |
| 11 | π/2-QPSK | 2 | 1 | 7/8 | 2695 |
| 12 | π/2-16 QAM | 4 | 1 | 1/2 | 3080 |
| 13 | π/2-16 QAM | 4 | 1 | 5/8 | 3850 |
| 14 | π/2-16 QAM | 4 | 1 | 3/4 | 4620 |
| 15 | π/2-16 QAM | 4 | 1 | 13/16 | 5005 |
| 16 | π/2-16 QAM | 4 | 1 | 7/8 | 5390 |
| 17 | π/2-64 QAM | 6 | 1 | 5/8 | 5775 |
| 18 | π/2-64 QAM | 6 | 1 | 3/4 | 6930 |
| 19 | π/2-64 QAM | 6 | 1 | 13/16 | 7507.5 |
| 20 | π/2-64 QAM | 6 | 1 | 7/8 | 8085 |

Typically, constellation diagrams have a uniform shape which simplifies demapper implementation. However, uniform constellations suffer a performance penalty. For this reason, next generation communication systems are going to consider non-uniform constellations (NUCs) which offer higher robustness against impairments such as noise, i.e. lower bit error rate at same noise power as uniform constellations.

The transmitter adapts the MCS index to channel conditions. For example, short distance links may support a higher constellation order as long distance links because of increased link attenuation (path loss). Link adaption algorithms on medium access layer (MAC) observe channel conditions via RSSI, (packet) error rate, SNR for example and decide on constellation to be used or applied for following data portion. For a transmitting station (i.e. communication device; also abbreviated as STA) to adjust the MCS, it requires feedback of channel conditions of the receiving STA. For this purpose, a STA can transmit a link measurement request to another STA and receive a link measurement report which holds link quality information such as RSNI (received signal-to-noise indication). The RSNI can be an input parameter to a link adaption algorithm, which may also consider data latency requirements (e.g. video has higher requirements than data transfer) and the amount of data waiting to be sent (e.g. current data buffer size). The actual link adaption algorithm is implementation dependent and not part of the IEEE802.11 standard. However, several publications with respect to advanced link adaption exist. The link adaption algorithm faces boundary conditions in terms of supported features of a STA (including capabilities, as explained below). For example, the receiving STA may not support all entries of a MCS table and thus the transmitting STA may not use such MCS in communication with this particular STA.

In case a communicating STA pair supports NUCs, a link adaption algorithm may consider choosing NUC for data transmission. As NUCs offer improved sensitivity at same bit rate as conventional uniform constellations (UC), different selection strategies are possible.

As soon as a MCS has a corresponding non-uniform constellation derivative, NUCs are always applied as they offer improved robustness against noise and impairments resulting in lower (packet) error rate, lower outage probability and less retransmissions.

In case data transmission with a uniform constellation MCS results in an increased error rate, the link adaption algorithm may switch to a corresponding non-uniform constellation MCS for achieving same data rate at lower error rate. Thus, NUCs can be seen as an intermediate step between two neighboring uniform constellation MCS entries.

Some entries of the MCS table may be optional, i.e. depending on transmitter/receiver implementation some MCS table entries may not be supported. For this reason, IEEE802.11ad defines a "DMG Capabilities element" as shown in FIG. 8, which indicates among other features the supported MCS set in transmit and receive mode. This information field is present in an association request for example, which is transmitted prior to regular data communications. The MCS capability data is partly contained in the "DMG capabilities element" (extended MCS capabilities) or in the "DMG STA capability Information" field, which holds a "supported MCS set". Signaling details for IEEE802.11ad are given in FIGS. 9 to 12.

In order to receive or decode data messages correctly, the receiver requires knowledge of several parameters such as applied MCS. All parameters, which are required to demodulate a WLAN data packet, reside in a preamble, which consists of header-A and header-B and other fields such as legacy preamble parts in IEEE802.11ay. The preamble is always modulated with fixed MCS and encoding may be different for various preamble parts. This particular MCS is very robust and mandatory for all STAs so that every STA can demodulate this data and conclude on the MCS used for data communications.

Header-A is present in single-user (SU) and multi-user (MU) mode, whereas header-B is only present in MU mode. In SU mode an AP transmits one or more data streams to a single STA, whereas in MU mode an AP transmits one or more data streams to several STAs. In MU mode the number of streams per STA is variable. Data streams to different users are separated in spatial domain, e.g. by several beams transmitted over one or more phased antenna arrays (PAAs) and/or polarization multiplex or in frequency domain, e.g. by several non-overlapping channels with different center frequencies. Besides, MU separation can also be implemented via time (time division multiple access—TDMA), which is however not yet implemented in 60 GHz WLAN 802.11ad/ay. Herein, the term "transmission stream" is used meaning an independent stream from transmitter to receiver. Such a stream can be achieved via MIMO or frequency multiplex.

Contents and structure of header-A vary if transmitted in SU or MU mode. In MU mode, various and different header-B are present on each spatial stream. Contents of header-A in SU mode and MU mode are given in Table 2 and Table 3, respectively, whereas contents of header-B are given in Table 4.

TABLE 2

| Field | Number of bits | Start bit | Description |
|---|---|---|---|
| SU/MU Format | 1 | 0 | Indicates whether the PPDU is a SU PPDU or a MU PPDU. Set to 0 to indicate a SU PPDU and set to 1 otherwise. |
| Channel Aggregation | 1 | 1 | Set to 0 to indicate that the BW field specifies a 2.16 GHz, 4.32 GHz, 6.48 GHz or 8.64 GHz channel PPDU. Set to 1 to indicate that the BW field specifies a 2.16 + 2.16 GHz or 4.32 + 4.32 GHz PPDU. |
| BW | 8 | 2 | A bitmap that indicates the channel(s) over which the PPDU is transmitted on. If a bit is set to 1, it indicates that the corresponding channel is used for the PPDU transmission; otherwise if the bit is set to 0, the channel is not used. Bit 0 corresponds to channel 1, bit 1 corresponds to channel 2, and so on. |
| Primary Channel Number | 3 | 10 | Contains the 3 LSBs of the primary channel number of the BSS minus one |

TABLE 2-continued

| Field | Number of bits | Start bit | Description |
|---|---|---|---|
| Beamformed | 1 | 13 | Set to 1 to indicate that channel estimate smoothing is recommended. Set to 0 otherwise. |
| Short/Long LDPC | 1 | 14 | Indicates the LDPC codeword length used in the PSDU. Set to 0 for LDPC codeword of length 672. Set to 1 for LDPC codeword of length 1344. |
| STBC Applied | 1 | 15 | If set to 1, indicates that STBC was applied at the transmitter. Otherwise, set to 0. |
| PSDU Length | 22 | 16 | Length of the PSDU field in octets. |
| Number of SS | 3 | 38 | The value of this field plus one indicates the number of SSs transmitted in the PPDU. |
| EDMG-MCS | 21 | 41 | If the value of the Number of SS field is 3 or less, the EDMG-MCS field is as defined in Table 6. Otherwise, the EDMG-MCS field is as defined in Table 7. |
| EDMG TRN Length | 8 | 62 | Indicates the number of TRN-Units present in the TRN field of the PPDU. |
| RX TRN-Units per Each TX TRN-Unit | 8 | 70 | This field is reserved if the value of the EDMG TRN Length field is 0. Otherwise, this field indicates the number of consecutive TRN-Units in the TRN field for which the transmitter remains with the same transmit AWV. |
| Phase Hopping | 1 | 78 | If set to 1 in an EDMG OFDM mode PPDU, this field indicates that phase hopping is used. Otherwise this field is set to 0. This field is reserved in an EDMG SC mode PPDU, or if the transmitter or receiver do not support phase hopping. |
| Open Loop Precoding | 1 | 79 | If the Phase Hopping field is set to 1, this field indicates if open loop precoding is used. If this field is 1, open loop precoding is used. Otherwise, open loop precoding is not used. If the Phase Hopping field is reserved, this field is also reserved. |
| Additional EDMG PPDU | 1 | 80 | A value of 1 indicates that this EDMG PPDU is immediately followed by another EDMG PPDU. A value of 0 indicates that no additional EDMG PPDU follows this EDMG PPDU. |
| Reserved | 31 | 81 | Set to 0 by the transmitter and ignored by the receiver. |
| CRC | 16 | 112 | Header Check sequence. |

TABLE 3

| Field | Number of bits | Start bit | Description |
|---|---|---|---|
| SU/MU Format | 1 | 0 | See Table 2 |
| FDMA Format | 1 | 1 | Indicates whether the MU PPDU is non-FDMA or FDMA. Set to 0 to indicate non-FDMA and set to 1 otherwise. |
| Channel Aggregation | 1 | 2 | See Table 2 |
| BW | 8 | 3 | See Table 2 |
| Primary Channel Number | 3 | 11 | See Table 2 |
| Beamformed | 1 | 14 | See Table 2 |
| Short/Long LDPC | 1 | 15 | See Table 2 |
| STBC Applied | 1 | 16 | See Table 2 |
| SS Descriptor Set 0 | 9 | 17 | Describes the SS assignment to the first STA addressed within the MU PPDU. |
| SS Descriptor Set 1 | 9 | 26 | Describes the SS assignment to the second STA addressed within the MU PPDU. |
| SS Descriptor Set 2 | 9 | 35 | Describes the SS assignment to the third STA addressed within the MU PPDU. |
| SS Descriptor Set 3 | 9 | 44 | Describes the SS assignment to the fourth STA addressed within the MU PPDU. |
| SS Descriptor Set 4 | 9 | 53 | Describes the SS assignment to the fifth STA addressed within the MU PPDU. |
| SS Descriptor Set 5 | 9 | 62 | Describes the SS assignment to the sixth STA addressed within the MU PPDU. |
| SS Descriptor Set 6 | 9 | 71 | Describes the SS assignment to the seventh STA addressed within the MU PPDU. |
| SS Descriptor Set 7 | 9 | 80 | Describes the SS assignment to the eight STA addressed within the MU PPDU. |
| EDMG TRN Length | 8 | 89 | See Table 2 |
| RX TRN-Units per Each TX TRN-Unit | 8 | 97 | See Table 2 |
| Reserved | 87 | 105 | Set to 0 by the transmitter and ignored by the receiver. |
| CRC | 16 | 112 | Header Check sequence. |

TABLE 4

| Field | Number of bits | Start bit | Description |
|---|---|---|---|
| Scrambler Seed | 7 | 0 | |
| PSDU Length | 22 | 7 | Length of the PSDU field in octets. |
| EDMG-MCS1 | 5 | 29 | Indicates the modulation and coding scheme for the first spatial stream. If the IsSCPSDU field in the L-Header is equal to 1, this field contains a SC MCS index. If the IsSCPSDU field in the L-Header is equal to 0, this field contains an OFDM MCS index. |
| EDMG-MCS2 | 5 | 34 | Indicates the modulation and coding scheme for the second spatial stream and is reserved if the number of spatial streams is 1. If the IsSCPSDU field in the L-Header is equal to 1, this field contains a SC MCS index. If the IsSCPSDU field in the L-Header is equal to 0, this field contains an OFDM MCS index. |
| Reserved | 25 | 39 | |

In the following and in the entire description, IEEE802.11ad is referred to as DMG (directional multi gigabit), whereas IEEE 802.11ay is referred to as EDMG (enhanced directional multi gigabit).

Figure 13:
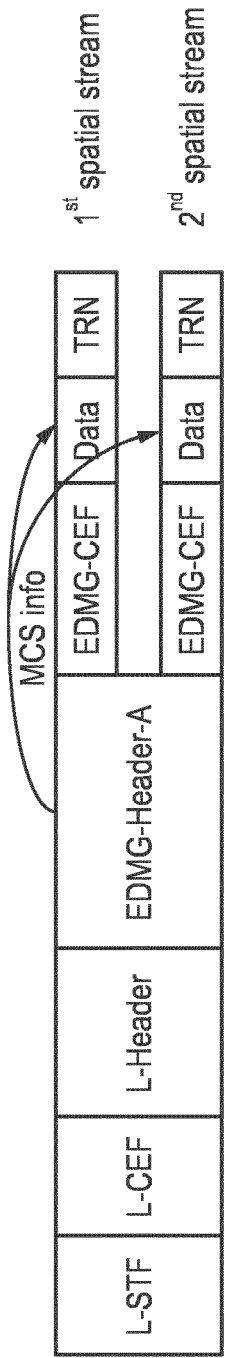
FIG. 13 shows a first embodiment of a preamble structure in SU data transmission and MCS signaling.
Figure 14:
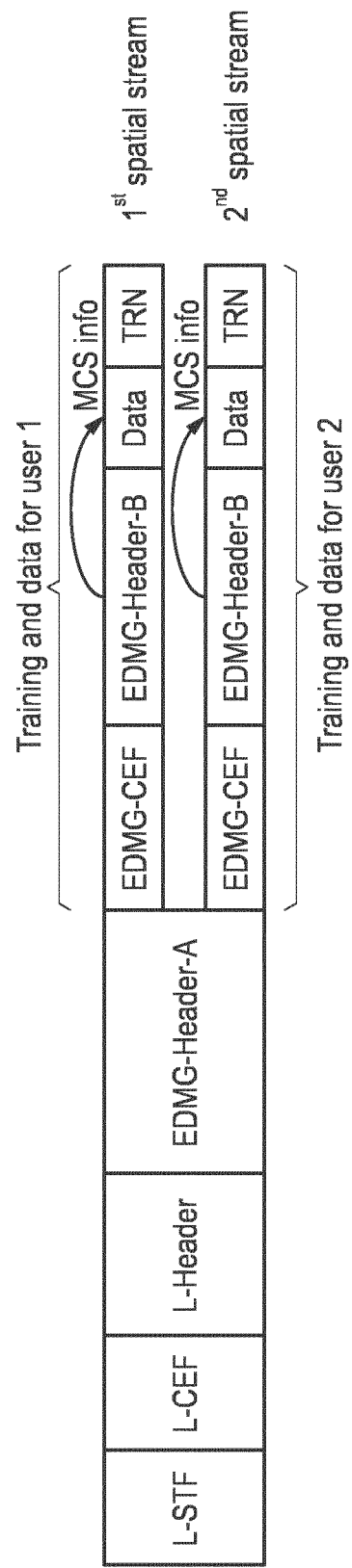
FIG. 14 shows a second embodiment of a preamble structure in MU data transmission and MCS signaling.

FIG. 13 shows an exemplary data transmission via two spatial streams in SU mode and FIG. 14 shows an exemplary data transmission via two spatial streams in MU mode. The abbreviations used are summarized and explained in Table 5.

TABLE 5

| Abbreviation | Meaning |
|---|---|
| L-STF | Non-EDMG Short Training field |
| L-CEF | Non-EDMG Channel Estimation field |
| L-Header | Non-EDMG Header field |
| EDMG-Header-A | EDMG Header A field |
| EDMG-STF | EDMG Short Training field |
| EDMG-CEF | EDMG Channel Estimation field |
| EDMG-Header-B | EDMG Header B field |
| Data | Data field |
| TRN | Training sequences field |

With integration of NUCs, an appropriate signaling is required. Several aspects need to be considered. To maintain backwards compatibility, communication devices may wish to support both UCs and NUCs. NUCs may only apply to a subset of MCS as gains for low constellation order are not significant. Also a single non-uniform constellation may support several code rates although a dedicated NUC is required for achieving maximum gain at each code rate. Different transmission schemes may be supported by the communication scheme such as single carrier (SC) or orthogonal frequency division multiplex (OFDM) modulation. Each transmission scheme requires different NUCs for maximum performance.

First, the SU mode (as illustrated in FIG. 13) shall be discussed. According to one aspect of the present disclosure an indication (also called non-uniform constellation indicator) is added in header-A to signal the use of NUC. This bit is referred to as EDMG-NUC in the following. The following rules apply in an embodiment: If the EDMG-NUC is set, the transmitter applies NUC for mapping. The actual MCS is determined by the value of MCS index (EDMG-MCS in Table 2) signaled in header-A. If the value of EDMG-MCS does not support NUC (i.e. there is no NUC available and/or the requested NUC is not supported by at least one of the devices), UC is applied for mapping even EDMG-NUC is set (e.g. for low constellation order where the gain of NUC compared to UC is negligible).

The SU mode may use MIMO and the transmitter may support several spatial streams. In this case, the EDMG-MCS field defines one MCS index for each spatial stream (see Table 6 and Table 7).

TABLE 6

| Subfield | Number of bits | Start bit | Description |
|---|---|---|---|
| EDMG-MCS1 | 5 | 0 | Indicates the modulation and coding scheme for the first spatial stream. |
| EDMG-MCS2 | 5 | 5 | Indicates the modulation and coding scheme for the second spatial stream. This field is reserved if the value of the Number of SS field is 0. |
| EDMG-MCS3 | 5 | 10 | Indicates the modulation and coding scheme for the third spatial stream. This field is reserved if the value of the Number of SS field is 1 or less. |
| EDMG-MCS4 | 5 | 15 | Indicates the modulation and coding scheme for the fourth spatial stream. This field is reserved if the value of the Number of SS field is 2 or less. |
| Reserved | 1 | 20 | Set to 0 by the transmitter and ignored by the receiver. |

TABLE 7

| Subfield | Number of bits | Start bit | Description |
|---|---|---|---|
| Base MCS | 5 | 0 | Indicates the lowest index of the modulation and coding scheme that is used to define the modulation and coding scheme of the spatial streams. |
| Differential EDMG-MCS1 | 2 | 5 | Each of these subfields is set as follows:<br>0: indicates the same MCS as the Base MCS subfield<br>1: indicates one higher order modulation than the Base MCS subfield with the same code rate<br>2: indicates two higher order modulation than the Base MCS subfield with the same code rate<br>3: indicates three higher order modulation than the Base MCS subfield with the same code rate<br>The Differential EDMG-MCS6 subfield is reserved if the value of the Number of SS field is 4.<br>The Differential EDMG-MCS7 subfield is reserved if the value of the Number of SS field is 5 or less.<br>The Differential EDMG-MCS8 subfield is reserved if the value of the Number of SS field is 6 or less. |
| Differential EDMG-MCS2 | 2 | 7 | |
| Differential EDMG-MCS3 | 2 | 9 | |
| Differential EDMG-MCS4 | 2 | 11 | |
| Differential EDMG-MCS5 | 2 | 13 | |
| Differential EDMG-MCS6 | 2 | 15 | |
| Differential EDMG-MCS7 | 2 | 17 | |
| Differential EDMG-MCS8 | 2 | 19 | |

Two options are available to signal NUC in the MIMO case: According to option a) A single EDMG-NUC indication defines if NUC is applied for all spatial streams. NUC is used for mapping of a particular spatial stream if EDMG-NUC is set and the corresponding MCS index supports NUC. According to option b) several EDMG-NUC indications define if NUCs is applied for a particular spatial stream. The number of EDMG-NUC indications is equal to the number of EDMG-MCS indices.

The number of supported spatial streams of the above mentioned MCS signaling for MIMO is limited. For example, the EDMG-MCS field is limited to 21 bits in IEEE802.11ay, i.e. a maximum of 4 different MCS indices can be signaled and hence a maximum of 4 different spatial streams are supported with this signaling (see Table 6). However, it is desired to support up to 8 spatial streams. For that reason, MCS signaling is performed differentially if the number of spatial streams exceeds 4 (see Table 7). The EDMG-MCS field defines a base-MCS index which is applied for the first spatial stream (first 5 bits). The MCS index of each further spatial stream is indicated by two bits according to the following shown in Table 7. Also for differential MCS signaling, both options a) and b) mentioned above are proposed. However, the number of EDMG-NUC indications in case b) corresponds to the number of differentially signaled EDMG-MCS (case c). As an alternative, only 4 bits can be used. In this case, a group of e.g. two spatial streams has the same EDMG-NUC indication (case d).

Since header-A contents are required to have fixed length, the EDMG-NUC indication generally has the same length and should thus have the length in worst case scenario, i.e. 1 bit (case a), 4 bits (case b), 8 bits (case c) or 4 bits (case d).

In the MU mode (see FIG. 14), header-A has no EDMG-MCS indication. The EDMG-MCS indication resides in header-B and comprises at least one MCS index. It is proposed to have one or two bit(s) (also called non-uniform constellation indicator) in header-B, which indicates if NUC is used for mapping. The actual MCS is determined by the value of MCS index (EDMG-MCS in Table 2) signaled in header-B. Signaling in header-B is required because STAs may have different capabilities and some may or may not support NUC.

Table 8 and Table 9 show the proposed header contents for header-A in SU and header-B including the proposed modifications from above.

TABLE 8

| Field | Number of bits | Start bit | Description |
|---|---|---|---|
| SU/MU Format | 1 | 0 | Indicates whether the PPDU is a SU PPDU or a MU PPDU. Set to 0 to indicate a SU PPDU and set to 1 otherwise. |
| Channel Aggregation | 1 | 1 | Set to 0 to indicate that the BW field specifies a 2.16 GHz, 4.32 GHz, 6.48 GHz or 8.64 GHz channel PPDU. Set to 1 to indicate that the BW field specifies a 2.16 + 2.16 GHz or 4.32 + 4.32 GHz PPDU. |

TABLE 8-continued

| Field | Number of bits | Start bit | Description |
|---|---|---|---|
| BW | 8 | 2 | A bitmap that indicates the channel(s) over which the PPDU is transmitted on. If a bit is set to 1, it indicates that the corresponding channel is used for the PPDU transmission; otherwise if the bit is set to 0, the channel is not used. Bit 0 corresponds to channel 1, bit 1 corresponds to channel 2, and so on. |
| Primary Channel Number | 3 | 10 | Contains the 3 LSBs of the primary channel number of the BSS minus one |
| Beamformed | 1 | 13 | Set to 1 to indicate that channel estimate smoothing is recommended. Set to 0 otherwise. |
| Short/Long LDPC | 1 | 14 | Indicates the LDPC codeword length used in the PSDU. Set to 0 for LDPC codeword of length 672. Set to 1 for LDPC codeword of length 1344. |
| STBC Applied | 1 | 15 | If set to 1, indicates that STBC was applied at the transmitter. Otherwise, set to 0. |
| PSDU Length | 22 | 16 | Length of the PSDU field in octets. |
| Number of SS | 3 | 38 | The value of this field plus one indicates the number of SSs transmitted in the PPDU. |
| EDMG-MCS | 21 | 41 | If the value of the Number of SS field is 3 or less, the EDMG-MCS field is as defined in Table 6. Otherwise, the EDMG-MCS field is as defined in Table 7. |
| EDMG TRN Length | 8 | 62 | Indicates the number of TRN-Units present in the TRN field of the PPDU. |
| RX TRN-Units per Each TX TRN-Unit | 8 | 70 | This field is reserved if the value of the EDMG TRN Length field is 0. Otherwise, this field indicates the number of consecutive TRN-Units in the TRN field for which the transmitter remains with the same transmit AWV. |
| Phase Hopping | 1 | 78 | If set to 1 in an EDMG OFDM mode PPDU, this field indicates that phase hopping is used. Otherwise this field is set to 0. This field is reserved in an EDMG SC mode PPDU, or if the transmitter or receiver do not support phase hopping. |
| Open Loop Precoding | 1 | 79 | If the Phase Hopping field is set to 1, this field indicates if open loop precoding is used. If this field is 1, open loop precoding is used. Otherwise, open loop precoding is not used. If the Phase Hopping field is reserved, this field is also reserved. |
| Additional EDMG PPDU | 1 | 80 | A value of 1 indicates that this EDMG PPDU is immediately followed by another EDMG PPDU. A value of 0 indicates that no additional EDMG PPDU follows this EDMG PPDU. |
| NUC | 1, 4, or 8 | 81 | This bit indicates use of NUC |
| Reserved | 30, 27, or 23 | 82, 85, or 89 | Set to 0 by the transmitter and ignored by the receiver. |
| CRC | 16 | 112 | Header Check sequence. |

TABLE 9

| Field | Number of bits | Start bit | Description |
|---|---|---|---|
| Scrambler Seed | 7 | 0 | |
| PSDU Length | 22 | 7 | Length of the PSDU field in octets. |
| EDMG-MCS1 | 5 | 29 | Indicates the modulation and coding scheme for the first spatial stream. If the IsSCPSDU field in the L-Header is equal to 1, this field contains a SC MCS index. If the IsSCPSDU field in the L-Header is equal to 0, this field contains an OFDM MCS index. |
| EDMG-MCS2 | 5 | 34 | Indicates the modulation and coding scheme for the second spatial stream and is reserved if the number of spatial streams is 1. If the IsSCPSDU field in the L-Header is equal to 1, this field contains a SC MCS index. If the IsSCPSDU field in the L-Header is equal to 0, this field contains an OFDM MCS index. |
| NUC | 1 | 39 | This bit indicates use of NUC |
| Reserved | 24 | 40 | Set to 0 by the transmitter and ignored by the receiver. |

Another embodiment for SU mode and MU mode includes adding NUC MCS to the MCS table. Typically, the MCS table is sorted twofold: First, with respect to increasing throughput and second with respect to increasing sensitivity. The sensitivity defines the robustness of a modulation scheme with respect to noise, i.e. a MCS having a low sensitivity is more robust than a MCS with high sensitivity. Since NUC has lower sensitivity compared to UC, prior to each UC MCS a NUC MCS can be placed in the table (option a).

As an alternative, MCS indices with NUC can also be placed at the end of the MCS table (option c) or at the end of each constellation size (option b). Still further, separate MCS tables for UC and MCS may be used. In all alternative cases, an ordering with increasing throughput is desired. FIGS. 15, 16 and 17 show implementation examples of the three options a, b and c.

As mentioned above, STAs exchange capability information to indicate their support of different modes of operation. Since NUC will be a differentiating feature of STAs, a NUC capabilities field is introduced into the DMG/EDMG capabilities element similar as shown in FIG. 8 for a first embodiment of a capabilities information field according to the present disclosure. In exceptional cases, e.g. if the non-uniform constellation capability is defined to be equal for the mapping and demapping circuitry, then only the transmitter (or only the receiver) may be required to transmit capability information only, which then holds for both the mapping and demapping circuitry.

Several options for the content of the NUC capabilities element exist. The best signaling option depends on the number of different NUCs used:

i) Indication of NUC support for Tx and Rx; the indication should be done for each supported transmission scheme such as SC and/or OFDM; respectively.

ii) Indication of maximum MCS with NUC support for Tx and Rx as well as SC and OFDM scheme.

A signaling example for option i) is shown in FIG. 18. In total 4 bits are used to indicate NUC support for Tx, Rx, SC, and OFDM, respectively. Differentiation between Tx and Rx is favorable since NUC modulation at transmitter side is much simpler in implementation as demapping on receiver side, i.e. some STAs may support NUC in transmission mode (Tx) but not in receiving mode (Rx).

A signaling example for option ii) is shown in FIG. 19. Here, the maximum MCS index for NUC which is supported by the STA is signaled for Tx, Rx, SC, and OFDM, respectively. In total 4 subfields with each having 5 bits are required since the encoding of a single MCS index takes 5 bits (i.e. MCS index has a range from 0 to 31).

It is also possible to enumerate all different NUCs which may be a lower number than the number of different MCS indices. Such an enumeration can be beneficial for capability signaling since a lower number of bits can be used for representation of maximum MCS for Tx, Rx, SC, and OFDM. In this case, the number of bits per subfield in FIG. 19 changes to a lower value. For example, if in total 4 NUCs are available for SC and OFDM, each subfield can be encoded with 2 bits only.

The size of the NUC capability field changes depending on the signaling. Option i) for example takes 4 bits whereas option ii) can take up to 20 bits according to the given numbers. Typically, capability fields have a size of multiple of 1 byte (i.e. 8 bits). Thus, the actual byte length is determined by rounding the number of bits to the next integer multiple of 8 bits. All remaining bits are reserved for future use and set to zero.

Figures 20, 21:
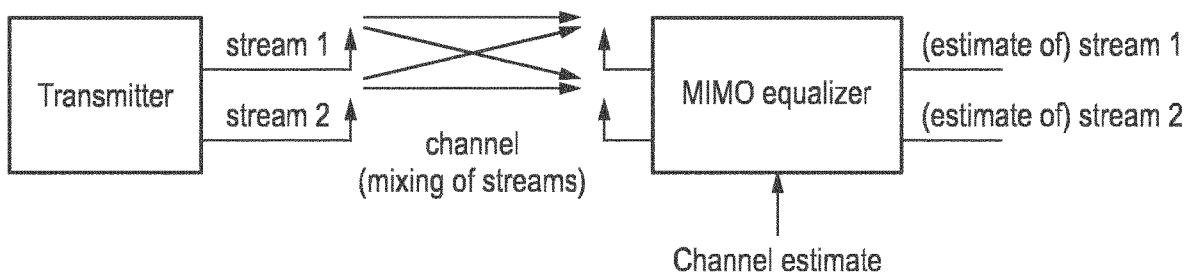
FIG. 20 shows a schematic diagram of a MIMO equalizer for multi-stream operation.
FIG. 21 shows a third embodiment of a capabilities information field according to the present disclosure.

As outlined above, the IEEE802.11ay standard allows for transmission of several spatial streams. For a receiver to differentiate those streams, a MIMO equalizer such as ZF (zero-forcing), MMSE (minimum mean squared error), ML (maximum likelihood) is required on receiver side as shown in FIG. 20. Typically, the ML receiver performs best but has a very large computational complexity. However, it has been shown that reduced complexity at same performance can be achieved by sphere decoding. Since many sphere decoding schemes often rely on the uniform structure of constellations, it is very difficult to design such a scheme for NUC. Thus, it may be appropriate to restrict the use of NUC modulation in multiple stream operation. Such a restriction can be implemented by a modified NUC capabilities field. FIG. 21 shows a possible extension of FIG. 19. The new subfield gives the maximum number of spatial streams with NUC support in receive mode.

Figure 22:
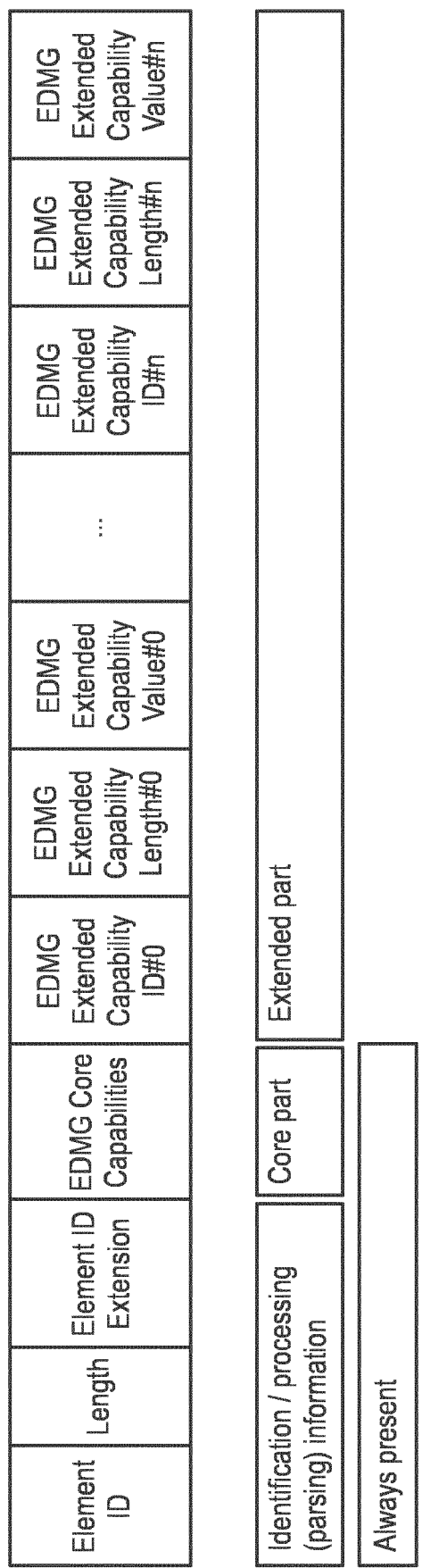
FIG. 22 shows an embodiment of a split EDMG capabilities element according to the present disclosure.

According to another embodiment the EDMG capabilities element is split in a core and an extended part as shown in FIG. 22. The EDMG core capabilities have fixed length and hold all necessary (mandatory) capability information, whereas the extended part is optional and can have variable length. NUC capability information has fixed length and has thus the ability to be in the core element, but it can be envisioned to be also in the extended part. As a variant, basic information may reside in the core part (e.g. contents of FIG. 18) whereas detailed information (e.g. contents of FIG. 19) may reside in the extended part.

Within a Link Measurement Report representing feedback, and more precisely in the Link Margin Element, an MCS field is present, which contains a recommendation on the MCS value which could be used, according to the link measurements at the STA. The current Link margin element is defined as shown in Table 10, whereas the MCS values are according to the MCS defined in IEEE802.11ad and therefore are no longer compatible with the new MCSs (including the ones corresponding to NUCs).

TABLE 10

| Element ID | Length | Activity | MCS | Link Margin | SNR | Reference Timestamp |
|---|---|---|---|---|---|---|

Furthermore the current link measurement report does not contain information on the number of streams which can be used. To accommodate the new changes to the MCS table, a new format for this element can be envisioned, by using an element id extension field and modified or new MCS fields which contain an estimate of the number of streams which can be used with the corresponding MCS per stream.

To signal NUC preference an implicit rule (a) or a dedicated signaling (b) can be thought of:

(a) Whenever corresponding NUC capabilities indicate NUC support for both communication devices, the MCS indexes within the MCS tables should be assumed to correspond to NUCs (FIGS. 15, 16).

(b) The link margin element has an additional NUC indication (single bit).

Thus, in an embodiment the transmission circuitry may be configured to transmit a link measurement report including a link margin element indicating its preference of non-uniform constellation indicator indicating if and which non-uniform constellation to be applied for upcoming data communications from the counterpart communication device to said communication device. If there are two communication devices (A and B) performing bidirectional communications, wherein A transmits data to B and B receives data from A, B deduces link quality and returns this info to A (feedback) to be considered for upcoming communications in direction A→B, then the feedback holds link quality information, but may also hold a recommendation for device A if and which NUC to use (B recommends to A). It is a recommendation since A decides what kind of constellation it finally uses for transmitting data from A to B, i.e. A may or may not follow the recommendation.

In summary, according to the present disclosure a communication device and method are presented that support the use of both uniform and non-uniform constellations and provide a reasonable solution for signaling.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A communication device for communication with a counterpart communication device, said communication device comprising:
an antenna unit comprising one or more antennas;
a transmission circuitry configured to transmit one or more transmission streams, said transmission circuitry comprising
a mapping circuitry configured to map transmission data on transmission symbols by mapping a predetermined number of transmission bits of transmission data onto a transmission symbol by use of a transmission constellation from among a plurality of transmission constellations; and
a conversion circuitry configured to convert said transmission symbols into one or more transmission streams to be transmitted; and
a reception circuitry configured to receive one or more reception streams, said reception circuitry comprising
a reconversion circuitry configured to reconvert said received one or more reception streams into reception symbols; and
a demapping circuitry configured to demap said reception symbols onto reception data by demapping a reception symbol onto a predetermined number of reception bits of reception data by use of a reception constellation,
wherein said transmission circuitry is configured to transmit capability information indicating if non-uniform transmission constellations are supported by the mapping circuitry and/or if non-uniform reception constellations are supported by the demapping circuitry.

2. The communication device as defined in any one of the preceding embodiments, wherein said transmission circuitry is configured to transmit capability information indicating which non-uniform transmission constellations are supported by the mapping circuitry and/or which non-uniform reception constellations are supported by the demapping circuitry.

3. The communication device as defined in any one of the preceding embodiments, wherein said transmission circuitry is configured to transmit capability information including a maximum transmission modulating coding scheme index of non-uniform constellations indicating up to which modulating coding scheme index non-uniform transmission constellations are supported by the mapping circuitry and/or a maximum reception modulating coding scheme index of non-uniform constellations indicating up to which modulating coding scheme index non-uniform transmission constellations are supported by the demapping circuitry.

4. The communication device as defined in any one of the preceding embodiments, wherein said transmission circuitry is configured to transmit capability information including single carrier capability information indicating for single carrier transmission and reception, if non-uniform transmission constellations are supported by the mapping circuitry and/or if non-uniform reception constellations are supported by the demapping circuitry, and/or to transmit capability information including multi-carrier capability information indicating for multi-carrier transmission and reception, if non-uniform transmission constellations are supported by the mapping circuitry and/or if non-uniform reception constellations are supported by the demapping circuitry.

5. The communication device as defined in any one of the preceding embodiments, wherein said transmission circuitry is configured to embed said capability information into a capabilities element.

6. The communication device as defined in any one of the preceding embodiments, wherein said transmission circuitry is configured to add said capability information into capabilities field included in a capabilities element.

7. The communication device as defined in any one of the preceding embodiments, wherein said receiver is configured to receive counterpart capability information from the counterpart communication device, said counterpart capability information indicating if non-uniform transmission constellations are supported by a mapping circuitry of the counterpart communication device and if non-uniform reception constellations are supported by a demapping circuitry of the counterpart communication device.

8. The communication device as defined in embodiment 7, further comprising a selection circuitry configured to select, based on the capability information and the received counterpart capability information, a transmission constellation for use by the mapping circuitry.

9. The communication device as defined in embodiment 8, wherein said selection circuitry is configured to additionally base the selection on one or more of channel estimation information, a desired throughput, a desired latency, a desired code rate, a desired error rate, a desired sensitivity, a desired power consumption, a measured SNR or SINR at the counterpart communication device and a recommended modulating coding scheme index indicated by the counterpart communication device.

10. The communication device as defined in any one of the preceding embodiments, wherein said selection circuitry is configured to select a uniform transmission constellation if the mapping circuitry does not support non-uniform constellations and/or if received counterpart capability information indicates that a demapping circuitry of the counterpart communication device does not support non-uniform constellations.

11. The communication device as defined in any one of the preceding embodiments, wherein said transmission circuitry is configured to transmit a non-uniform constellation indicator indicating if and which non-uniform constellation is used by the mapping circuitry.

12. The communication device as defined in any one of the preceding embodiments 1, wherein said transmission circuitry is configured to transmit the non-uniform constellation indicator in a header of a transmission frame.

13. The communication device as defined in embodiment 12, wherein said transmission circuitry is configured to transmit the non-uniform constellation indicator in a header of a transmission frame, said indicator indicating if and/or which non-uniform constellation is used for the data of all transmission streams, groups of transmission streams or each separate transmission stream included in the transmission frame.

14. The communication device as defined in embodiment 12, wherein said transmission circuitry is configured to transmit the non-uniform constellation indicator in a header of each transmission stream of a transmission frame, said indicator indicating if and which non-uniform constellation is used for the data of the respective transmission stream.

15. The communication device as defined in any one of the preceding embodiments, wherein said transmission circuitry is configured to transmit capability information including restriction information indicating the maximum number of transmission streams for which a non-uniform constellation can be used.

16. The communication device as defined in embodiment 8, wherein said selection circuitry is configured to select a constellation from a constellation table listing uniform and non-uniform constellations or from separate constellation tables including a uniform constellations table and a non-uniform constellations table.

17. The communication device as defined in any one of the preceding embodiments, wherein said mapping circuitry is configured to select the transmission constellation used for mapping transmission data on transmission symbols for conversion into different transmission streams are selected individually per transmission stream.

18. The communication device as defined in any one of the preceding embodiments, wherein said transmission circuitry is configured to transmit a link measurement report including a link margin element indicating its preference of non-uniform constellation indicator indicating if and which non-uniform constellation to be applied for upcoming data communications from the counterpart communication device to said communication device.

19. A communication method for communication with a counterpart communication device, said communication method comprising:
   mapping transmission data on transmission symbols by mapping a predetermined number of transmission bits of transmission data onto a transmission symbol by use of a transmission constellation from among a plurality of transmission constellations;
   converting said transmission symbols into one or more transmission streams to be transmitted;
   transmitting said one or more transmission streams;
   receiving one or more reception streams;
   reconverting said received one or more reception streams into reception symbols;
   demapping said reception symbols onto reception data by demapping a reception symbol onto a predetermined number of reception bits of reception data by use of a reception constellation; and
   transmitting capability information indicating if non-uniform transmission constellations are supported by the mapping and/or if non-uniform reception constellations are supported by the demapping.

20. A non-transitory computer-readable recording medium that stores therein a computer program product, which, when executed by a processor, causes the method according to embodiment 19 to be performed.

21. A computer program comprising program code means for causing a computer to perform the steps of said method according to embodiment 19 when said computer program is carried out on a computer.

The invention claimed is:
1. A communication device for communication with a counterpart communication device, said communication device comprising:
   an antenna unit comprising one or more antennas;
   a transmission circuitry configured to transmit one or more transmission streams, said transmission circuitry comprising
      a mapping circuitry configured to map transmission data on transmission symbols by mapping a predetermined number of transmission bits of transmission data onto a transmission symbol by use of a transmission constellation from among a plurality of transmission constellations; and
      a conversion circuitry configured to convert said transmission symbols into one or more transmission streams to be transmitted; and
   a reception circuitry configured to receive one or more reception streams, said reception circuitry comprising
      a reconversion circuitry configured to reconvert said received one or more reception streams into reception symbols; and
      a demapping circuitry configured to demap said reception symbols onto reception data by demapping a reception symbol onto a predetermined number of reception bits of reception data by use of a reception constellation, wherein said transmission circuitry is configured to transmit capability information indicating if non-uniform transmission constellations are supported by the mapping circuitry and/or if non-uniform reception constellations are supported by the demapping circuitry, wherein said transmission circuitry is configured to transmit capability information including a maximum reception modulating coding scheme index of non-uniform constellations indicating up to which modulating coding scheme index non-uniform transmission constellations are supported by the demapping circuitry, wherein said transmission circuitry is configured to transmit a non-uniform constellation indicator in a header of a transmission frame indicating if and which non-uniform constellation is used by the mapping circuitry, wherein in response to the non-uniform constellation indicator being set, the transmitter circuitry applies non-uniform constellation for mapping.

2. The communication device as claimed in claim 1, wherein said transmission circuitry is configured to transmit capability information including single carrier capability information indicating for single carrier transmission and reception, if non-uniform transmission constellations are supported by the mapping circuitry and/or if non-uniform reception constellations are supported by the demapping circuitry, and/or to transmit capability information including multi-carrier capability information indicating for multi-carrier transmission and reception, if non-uniform transmission constellations are supported by the mapping circuitry and/or if non-uniform reception constellations are supported by the demapping circuitry.

3. The communication device as claimed in claim 1, wherein said transmission circuitry is configured to embed said capability information into a capabilities element.

4. The communication device as claimed in claim 1, wherein said transmission circuitry is configured to add said capability information into capabilities field included in a capabilities element.

5. The communication device as claimed in claim 1, wherein said receiver is configured to receive counterpart capability information from the counterpart communication device, said counterpart capability information indicating if non-uniform transmission constellations are supported by a mapping circuitry of the counterpart communication device and if non-uniform reception constellations are supported by a demapping circuitry of the counterpart communication device.

6. The communication device as claimed in claim 5, further comprising a selection circuitry configured to select, based on the capability information and the received counterpart capability information, a transmission constellation for use by the mapping circuitry.

7. The communication device as claimed in claim 6, wherein said selection circuitry is configured to additionally base the selection on one or more of channel estimation information, a desired throughput, a desired latency, a desired code rate, a desired error rate, a desired sensitivity, a desired power consumption, a measured SNR or SINR at the counterpart communication device and a recommended modulating coding scheme index indicated by the counterpart communication device.

8. The communication device as claimed in claim 6, wherein said selection circuitry is configured to select a constellation from a constellation table listing uniform and non-uniform constellations or from separate constellation tables including a uniform constellations table and a non-uniform constellations table.

9. The communication device as claimed in claim 1, wherein said selection circuitry is configured to select a uniform transmission constellation if the mapping circuitry does not support non-uniform constellations and/or if received counterpart capability information indicates that a demapping circuitry of the counterpart communication device does not support non-uniform constellations.

10. The communication device as claimed in claim 1, wherein said transmission circuitry is configured to transmit the non-uniform constellation indicator in a header of a transmission frame, said indicator indicating if and/or which non-uniform constellation is used for the data of all transmission streams, groups of transmission streams or each separate transmission stream included in the transmission frame.

11. The communication device as claimed in claim 1, wherein said transmission circuitry is configured to transmit the non-uniform constellation indicator in a header of each transmission stream of a transmission frame, said indicator indicating if and which non-uniform constellation is used for the data of the respective transmission stream.

12. The communication device as claimed in claim 1, wherein said transmission circuitry is configured to transmit capability information including restriction information indicating the maximum number of transmission streams for which a non-uniform constellation can be used.

13. The communication device as claimed in claim 1, wherein said mapping circuitry is configured to select the transmission constellation used for mapping transmission data on transmission symbols for conversion into different transmission streams are selected individually per transmission stream.

14. The communication device as claimed in claim 1, wherein said transmission circuitry is configured to transmit a link measurement report including a link margin element indicating its preference of non-uniform constellation indicator indicating if and which non-uniform constellation to be applied for upcoming data communications from the counterpart communication device to said communication device.

15. A communication method for communication with a counterpart communication device, said communication method comprising:

mapping transmission data on transmission symbols by mapping a predetermined number of transmission bits of transmission data onto a transmission symbol by use of a transmission constellation from among a plurality of transmission constellations;

converting said transmission symbols into one or more transmission streams to be transmitted;

transmitting said one or more transmission streams;

receiving one or more reception streams;

reconverting said received one or more reception streams into reception symbols;

demapping said reception symbols onto reception data by demapping a reception symbol onto a predetermined number of reception bits of reception data by use of a reception constellation;

transmitting capability information indicating if non-uniform transmission constellations are supported by the mapping and/or if non-uniform reception constellations are supported by the demapping;

wherein said capability information includes a maximum reception modulating coding scheme index of non-uniform constellations indicating up to which modulating coding scheme index non-uniform transmission constellations are supported by the demapping circuitry;

transmitting a non-uniform constellation indicator in a header of a transmission frame indicating if and which non-uniform constellation is used by the mapping circuitry; and in response to the non-uniform constellation indicator being set, applying non-uniform constellation for mapping.

16. A non-transitory computer-readable recording medium that stores therein a computer program product, which, when executed by a processor, causes the method according to claim 15 to be performed.

\* \* \* \* \*